United States Patent
Liu

(10) Patent No.: US 11,128,830 B2
(45) Date of Patent: Sep. 21, 2021

(54) SENSING MODULE AND DESIGN METHOD THEREOF

(71) Applicant: Egis Technology Inc., Taipei (TW)

(72) Inventor: Chia-Yu Liu, Taipei (TW)

(73) Assignee: Egis Technology Inc., Hsinchu (TW)

( * ) Notice: Subject to any disclaimer, the term of this patent is extended or adjusted under 35 U.S.C. 154(b) by 165 days.

(21) Appl. No.: 16/568,286

(22) Filed: Sep. 12, 2019

(65) Prior Publication Data

US 2020/0106979 A1    Apr. 2, 2020

Related U.S. Application Data

(60) Provisional application No. 62/738,226, filed on Sep. 28, 2018.

(30) Foreign Application Priority Data

Jul. 25, 2019    (CN) .......................... 201910677310.X

(51) Int. Cl.
   *H04N 5/378*    (2011.01)
   *G06K 9/00*    (2006.01)

(52) U.S. Cl.
   CPC ......... *H04N 5/378* (2013.01); *G06K 9/00053* (2013.01)

(58) Field of Classification Search
   CPC ........ H01L 27/14605; H01L 27/14627; H04N 5/369; H04N 5/378

USPC ...................................................... 250/208.1
See application file for complete search history.

(56) References Cited

U.S. PATENT DOCUMENTS

| 6,344,666 | B1 * | 2/2002 | Yamaguchi ....... H01L 27/14609 257/213 |
| 8,389,921 | B2 | 3/2013 | Nozaki et al. |
| 2016/0238836 | A1 | 8/2016 | Oganesian et al. |

FOREIGN PATENT DOCUMENTS

| CN | 102880867 | 1/2013 |
| CN | 106206628 | 12/2016 |
| TW | I619240 | 3/2018 |

\* cited by examiner

*Primary Examiner* — Kevin K Pyo
(74) *Attorney, Agent, or Firm* — JCIPRNET

(57) ABSTRACT

A sensing module is provided, including a sensing unit. The sensing unit is formed by a plurality of sensing pixels arranged in an array. Each of the plurality of sensing pixels includes a body and a sensing element. The sensing element is disposed on a bottom surface of the body. During sensing, a light may enter and pass through the bodies and be transmitted to the sensing elements. The sensing pixels are divided into at least a first group and a second group from a center of the array to a periphery of the array, and photon collection efficiency of sensing pixels in the first group is less than photon collection efficiency of sensing pixels in the second group. Meanwhile, a design method of a sensing module is also provided.

16 Claims, 7 Drawing Sheets

SENSING MODULE AND DESIGN METHOD THEREOF

CROSS-REFERENCE TO RELATED APPLICATION

This application claims the priority benefit of U.S. provisional application Ser. No. 62/738,226, filed on Sep. 28, 2018, and China application serial no. 201910677310.X, filed on Jul. 25, 2019. The entirety of each of the above-mentioned patent applications is hereby incorporated by reference herein and made a part of this specification.

BACKGROUND OF THE INVENTION

1. Field of the Invention

The invention relates to a sensing module and a design method thereof, in particular, to a sensing module having sensing pixels with different photon collection efficiency, and a design method thereof.

2. Description of Related Art

With the continuous evolution and improvement of electronic technologies and manufacturing technologies, information electronic products have been always innovated. Electronic products such as a computer, a mobile phone and a camera have become essential tools for modern people. In addition, fingerprint sensing devices need to be integrated in current intelligent mobile devices to enhance the use security of the intelligent mobile devices and support more intelligent functions.

At present, a user can put a finger on a display of a mobile phone for fingerprint sensing. However, light intensities sensed by sensing pixels which are close to the periphery of the sensing module are often lower than those sensed by sensing pixels which are close to the center of the sensing module. As a result, signal intensities obtained by the sensing module are different, which may affect the correctness and quality of a sensed fingerprint image. In the current solution, software at the back end is often used to correct the signal intensities, but a corrected image still has side effects, such as a side effect of detail loss due to noise amplification. Therefore, those skilled in the art are dedicated to researching how to design a sensing module that can sense uniform light intensities.

SUMMARY OF THE INVENTION

The invention provides a sensing module having sensing pixels with different photon collection efficiency, and a design method thereof, so as to uniformize light signal intensities sensed by sensing pixels located at different positions in the sensing module.

The invention provides a sensing module, including a sensing unit. The sensing unit is formed by a plurality of sensing pixels arranged in an array. Each sensing pixel includes a body and a sensing element. The sensing elements are disposed on the bottom surfaces of the bodies. During sensing, a light may enter and pass through the bodies and be transmitted to the sensing elements. The sensing pixels are divided into at least a first group and a second group from a center of the array to a periphery of the array, and photon collection efficiency of sensing pixels in the first group is less than photon collection efficiency of sensing pixels in the second group.

In an embodiment of the invention, each of the plurality of sensing pixels also includes a microlens disposed on the top surface of the body, and an area of a side, facing the body, of a microlens of each of the sensing pixels in the first group is less than an area of a side, facing the body, of a microlens of each of the sensing pixels in the second group.

In an embodiment of the invention, an area of an opening of a metal layer of each of the sensing pixels in the first group is less than an area of an opening of a metal layer of each of the sensing pixels in the second group.

In an embodiment of the invention, each of the plurality of sensing pixels includes a light guide structure, and a cross-sectional area of an upper opening of a light guide structure of each of the sensing pixels in the first group is less than a cross-sectional area of an upper opening of a light guide structure of each of the sensing pixels in the second group.

The invention further provides a design method of a sensing module, including: sensing a light by a sample sensing module to obtain original data; obtaining simulated data according to the original data; calculating the photon collection efficiency required by the plurality of sensing pixels at different positions in a target sensing module according to the simulated data, and determining structural data of the plurality of sensing pixels at different positions in the target sensing module according to the photon collection efficiency to form sensing pixel design data; and manufacturing the target sensing module according to the sensing pixel design data. The plurality of sensing pixels are divided into at least a first group and a second group from a center of the target sensing module to a periphery of the target sensing module, and photon collection efficiency of sensing pixels in the first group is less than photon collection efficiency of sensing pixels in the second group.

In an embodiment of the invention, the method of obtaining simulated data according to the original data includes: calculating a reciprocal of a value of the original data to form the simulated data.

Based on the above, according to the sensing module and the design method thereof of the invention, the plurality of sensing pixels of different structures are designed to be located at different positions of the sensing unit in the sensing module, and the photon collection efficiency of the sensing pixels having a smaller distance from the center point of the sensing unit is smaller than the photon collection efficiency of the sensing pixels having a lager distance from the center point of the sensing unit due to different structures. As a result, the light signal intensities sensed by the plurality of sensing pixels at different positions in the sensing unit may be uniformized.

In order to make the aforementioned characteristics and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
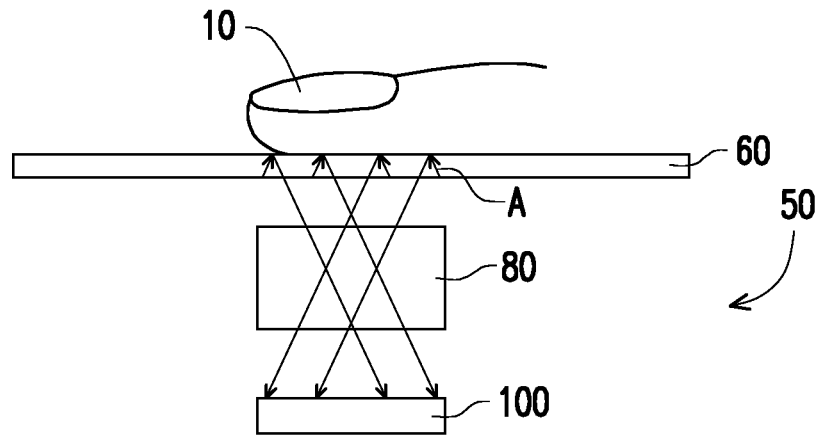
FIG. 1 is a schematic diagram of an electronic device according to an embodiment of the invention.

FIG. 1 is a schematic diagram of an electronic device according to an embodiment of the invention. Referring to FIG. 1, in this embodiment, the electronic device 50 includes a display device 60, an optical module 80 and a sensing module 100. A user puts a finger 10 on the upper surface of the display device 60 of the electronic device 50 for fingerprint sensing. Specifically, during the fingerprint sensing, the display device 60 emits a light A toward the finger 10 to be reflected by the finger 10. The light A is then transmitted through the optical module 80 and sensed by the sensing module 100, so that the sensing module 100 obtains fingerprint information carried in the light A to complete the fingerprint sensing.

In this embodiment, the display device 60 is, for example, a display panel or a touch display panel. For example, the display device 60 may be a display panel such as an organic light-emitting diode (OLED) display panel, but the invention is not limited thereto. Alternatively, the display device 60 may be a touch display panel such as an OLED display panel having a plurality of touch electrodes. The plurality of touch electrodes may be formed on the outer surface of the OLED display panel or embedded in the OLED display panel, and the plurality of touch electrodes may perform touch detection by self-capacitance or mutual capacitance.

The optical module 80 may comprise, for example, a lens set or a collimators structure. In this embodiment, the optical module 80 is, for example, a lens set, including a combination of one or more optical lenses having refractive power, such as various combinations of non-planar lenses including a biconcave lens, a biconvex lens, a concave-convex lens, a convex-concave lens, a plano-convex lens and a plano-concave lens. The invention does not limit the structure and type of the optical module 80. For example, the optical module 80 is composed of two lenses, but in other embodiments, the optical module 80 may be composed of three lenses or four lenses, and the invention is not limited thereto.

Figure 2:
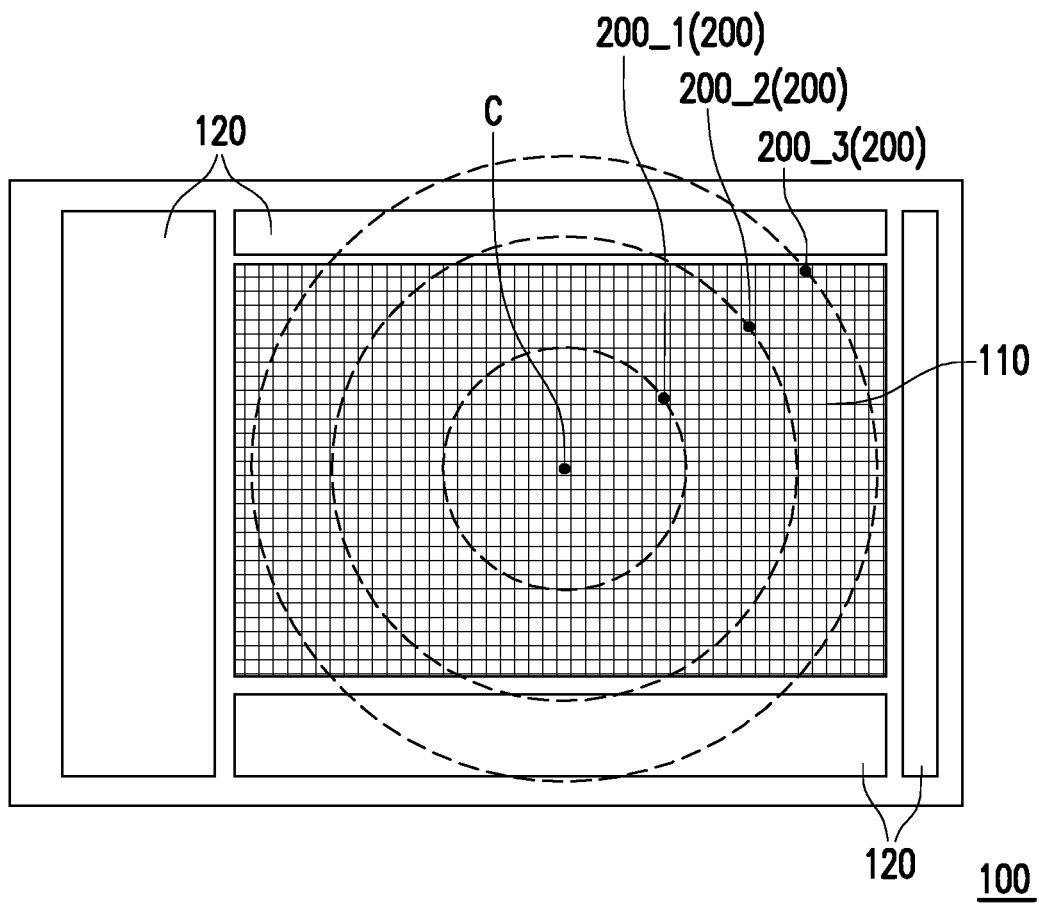
FIG. 2 is a schematic top view of a sensing module of FIG. 1.

FIG. 2 is a schematic top view of a sensing module of FIG. 1. Referring to both FIGS. 1 and 2, in this embodiment, the sensing module 100 includes a sensing unit 110 and a plurality of circuit structures 120. The sensing unit 110 comprises a plurality of sensing pixels 200 arranged in an array. The circuit structures 120 are disposed at the peripheries of these sensing pixels 200. The invention does not limit the forms and types of the circuit structures 120. It is worth mentioning that in this embodiment, the structures of the plurality of sensing pixels 200 having different distances from a center point C of the sensing unit 110 are different, so that the plurality of sensing pixels 200 have different photon collection efficiency. For example, the photon collection efficiency of a sensing pixel 200 increases as the distance from the center point C of the sensing unit 110 increases, so that the structures of the plurality of sensing pixels 200 located at the same concentric circle are identical, and the photon collection efficiency thereof are the same. Therefore, the photon collection efficiency of the sensing pixel 200_1 closer to the center point C of the sensing unit 110 is lower than the photon collection efficiency of the sensing pixel 200_2 at a medium distance from the center point C of the sensing unit 110, and the photon collection efficiency of the sensing pixel 200_2 at the medium distance from the center point C of the sensing unit 110 is lower than the photon collection efficiency of the sensing pixel 200_3 farther from the center point C of the sensing unit 110. As a result, the light intensities sensed by the plurality of sensing pixels located at different positions in the sensing module 100 may be uniformized.

In another embodiment, the plurality of sensing pixels 200 are divided into at least a first group (e.g. the group formed by the sensing pixels 200 inside the dotted circle at which the sensing pixel 200_1 is located) and a second group (e.g. the group formed by the sensing pixels 200 outside the dotted circle at which the sensing pixel 200_1 is located) from the center of the array to the periphery of the array, and the photon collection efficiency of the sensing pixels 200 in the first group is less than the photon collection efficiency of the sensing pixels 200 in the second group.

Figure 3:
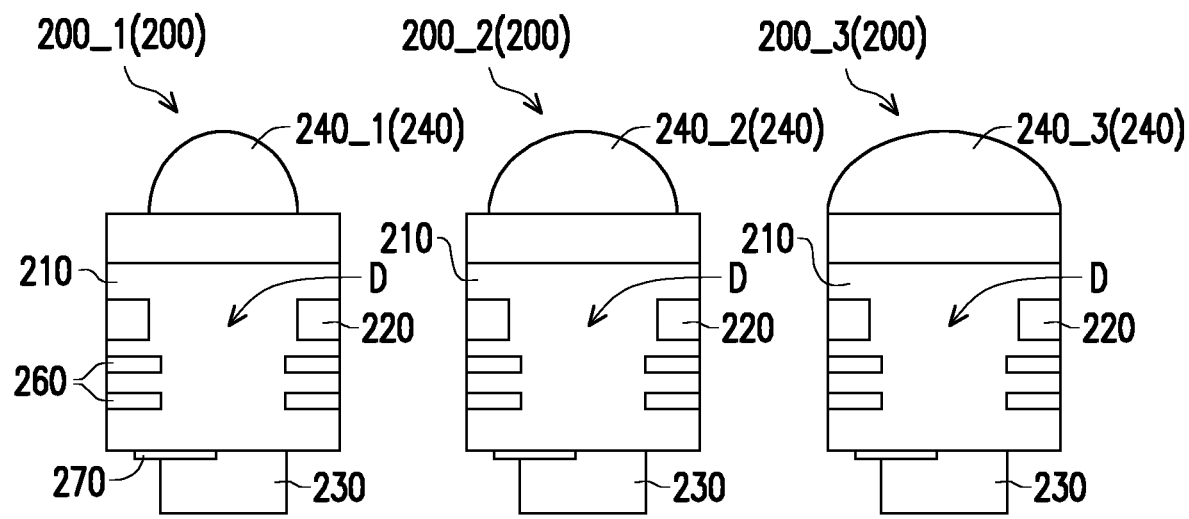
FIG. 3 is a schematic cross-sectional view of sensing pixels located at different positions in the sensing module of FIG. 2.

FIG. 3 is a schematic cross-sectional view of sensing pixels located at different positions in the sensing module of FIG. 2. Referring to both FIGS. 2 and 3, each of the plurality of sensing pixels 200 includes a body 210, a metal layer 220, a sensing element 230 and a microlens 240. The body 210 is of a solid structure having a receiving space, and may allow the light to pass therethrough. The bodies 210 of the adjacent sensing pixels 200 are disposed close to each other. In this embodiment, an electronic element 270 is further provided to be electrically connected to the sensing element 230. The electronic element 270 is, for example, a transistor, but the invention is not limited thereto.

The metal layer 220 is disposed in the body 210, and the metal layer 220 has an opening D to allow the light to pass therethrough. In this embodiment, at least one metal structure 260 similar to the metal layer 220 may be located below the metal layer 220, and has an opening structure similar to that of the metal layer 220 to allow the light to pass therethrough, and the invention is not limited thereto. The sensing element 230 is disposed on the bottom surface of the body 210, and is configured to receive the light passing through the body 210 to generate a light sensing signal. In this embodiment, the sensing element 230 is, for example, a photodiode. The microlens 240 is disposed on the top surface of the body 210. During fingerprint sensing, the display device 60 may emit the light to illuminate the finger 10 (see FIG. 1). The light is reflected by the finger and then transmitted to the sensing pixel 200, and the light enters the microlens 240 of the sensing pixel 200, and passes through the opening D of the metal layer 220, so as to be transmitted to the sensing element 230.

In a sensing pixel 200, if the size of the microlens 240 disposed on the body 210 is smaller, the photon collection efficiency of the sensing pixel 200 is lower; and if the area of the side, facing the body 210, of the microlens 240 disposed on the body 210 is larger, the photon collection efficiency of the sensing pixel 200 is higher. In other words, the size of the microlens 240 is substantially in direct proportion to the photon collection efficiency of the sensing pixel 200. In this embodiment, the area of the side, facing the body 210, of the microlens 240 of a sensing pixel 200 increases as the distance from the center point C of the sensing unit 110 increases. Particularly, the area of the side, facing the body 210, of the microlens 240_1 of the sensing pixel 200_1 closer to the center point C of the sensing unit 110 is smaller than the area of the side, facing the body 210, of the microlens 240_2 of the sensing pixel 200_2 at a medium distance from the center point C of the sensing unit 110, and the area of the side, facing the body 210, of the microlens 240_2 of the sensing pixel 200_2 at the medium distance from the center point C of the sensing unit 110 is smaller than the area of the side, facing the body 210, of the microlens 240_3 of the sensing pixel 200_3 farther from the center point C of the sensing unit 110. Therefore, the photon collection efficiency of the sensing pixel 200 increases as the distance from the center point C of the sensing unit 110 increases. As a result, the light signal intensities sensed by the plurality of sensing pixels 200 at different positions in a sensing array of the sensing module 100 are uniformized.

In another embodiment, the area of the side, facing the body 210, of the microlens 240 of the sensing pixels 200 in the first group (e.g. the group formed by the sensing pixels 200 inside the dotted circle at which the sensing pixel 200_1 is located, as shown in FIG. 2) is less than the area of the side, facing the body 210, of the microlens 240 of the sensing pixels 200 in the second group (e.g. the group formed by the sensing pixels 200 outside the dotted circle at which the sensing pixel 200_1 is located, as shown in FIG. 2). As a result, the photon collection efficiency of the sensing pixels 200 in the second group is greater than the photon collection efficiency of the sensing pixels 200 in the first group, so that the light signal intensities sensed by the plurality of sensing pixels 200 at different positions in the sensing array of the sensing module 100 are uniformized.

Figure 4:
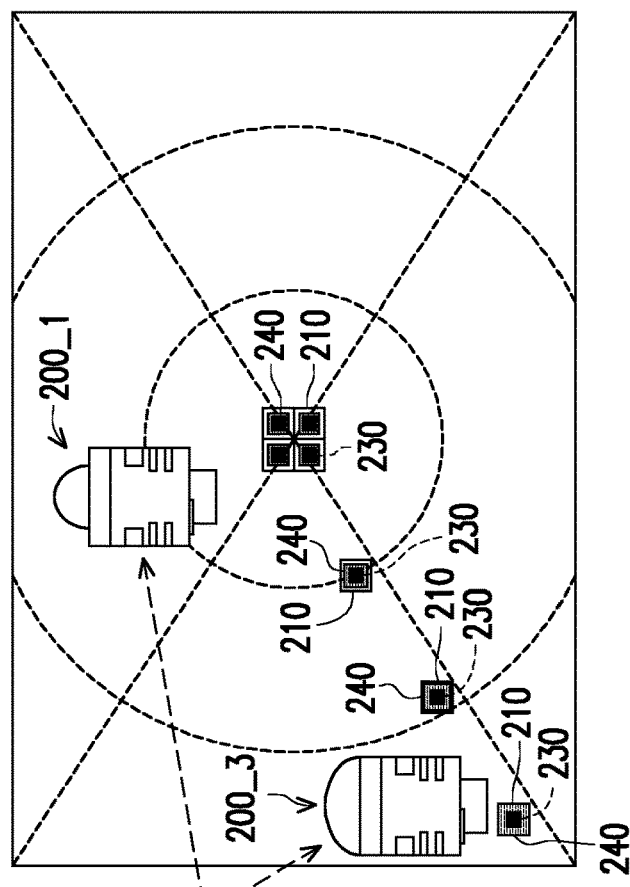
FIG. 4 shows a curve and diagram showing a correspondence between the photon collection efficiency of a sensing pixel and the size ratio of the maximum cross-sectional area of a microlens to the cross-sectional area of a body of the sensing pixel according to an embodiment of the invention.
Figure 4:
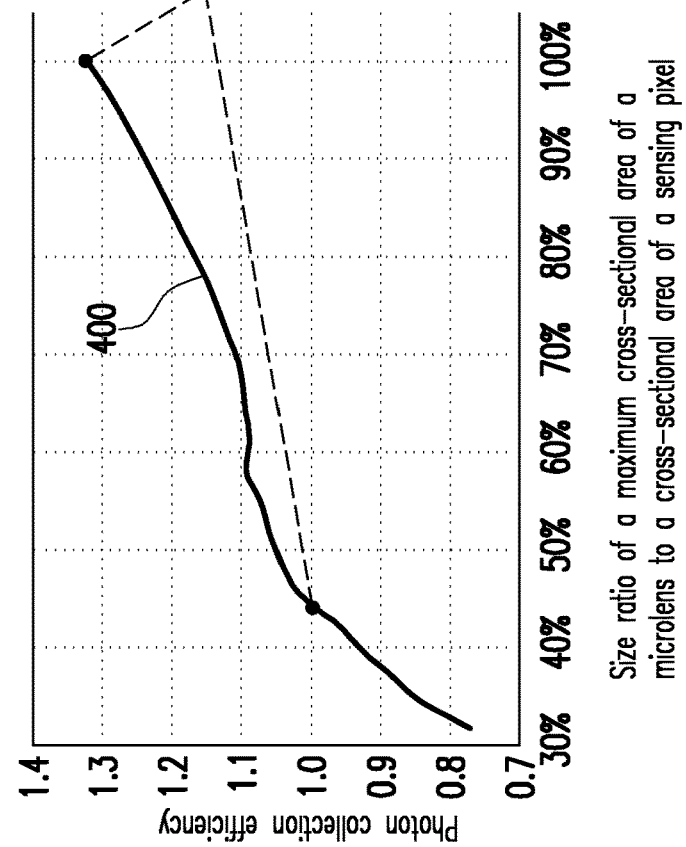

FIG. 4 shows a curve and diagram showing a correspondence between the photon collection efficiency of a sensing pixel and the size ratio of the maximum cross-sectional area of a microlens to the cross-sectional area of a body of the sensing pixel according to an embodiment of the invention. Referring to FIGS. 3 and 4, the structures of the plurality of sensing pixels 200 illustrated in FIG. 3 may be at least applied to the curve illustrated in FIG. 4. In this embodiment, a curve 400 refers to the photon collection efficiency corresponding to different size ratios of the microlenses 240 to the bodies 210 of the plurality of sensing pixels 200. The ordinate refers to the photon collection efficiency, and the abscissa refers to a ratio of the maximum cross-sectional area (i.e., the cross-sectional area of the microlens 240 facing the body 210) of the microlens 240 to the cross-sectional area (i.e., the cross-sectional area of the body 210) of the sensing pixel 200. As shown in FIG. 4, when the ratio of the maximum length of the cross-sectional area of the side, facing the body 210, of the microlens 240 of the sensing pixel 200 to the maximum length of the cross-sectional area of the body 210 of the sensing pixel 200 is from 0.6 to 1, the photon collection efficiency of the sensing pixel 200 may substantially linearly increase along with the growth of the ratio from 0.6 to 1. In other words, when the ratio of the cross-sectional area of the side, facing the body 210, of the microlens 240 to the cross-sectional area of the body 210 of the sensing pixel 200 increases from 0.4 to 1, the photon collection efficiency may substantially linearly increase. Therefore, during the design of the plurality of sensing pixels 200 located at different positions, the photon collection efficiency of the plurality of sensing pixels 200 may be designed by adjusting the ratio of the cross-sectional area of the side, facing the body 210, of the microlens 240 to the cross-sectional area of the body 210 of the sensing pixel 200 to be from 0.4 to 1. As a result, the light signal intensities sensed by the plurality of sensing pixels 200 at different positions in the sensing unit 110 may be uniformized.

Figure 5:
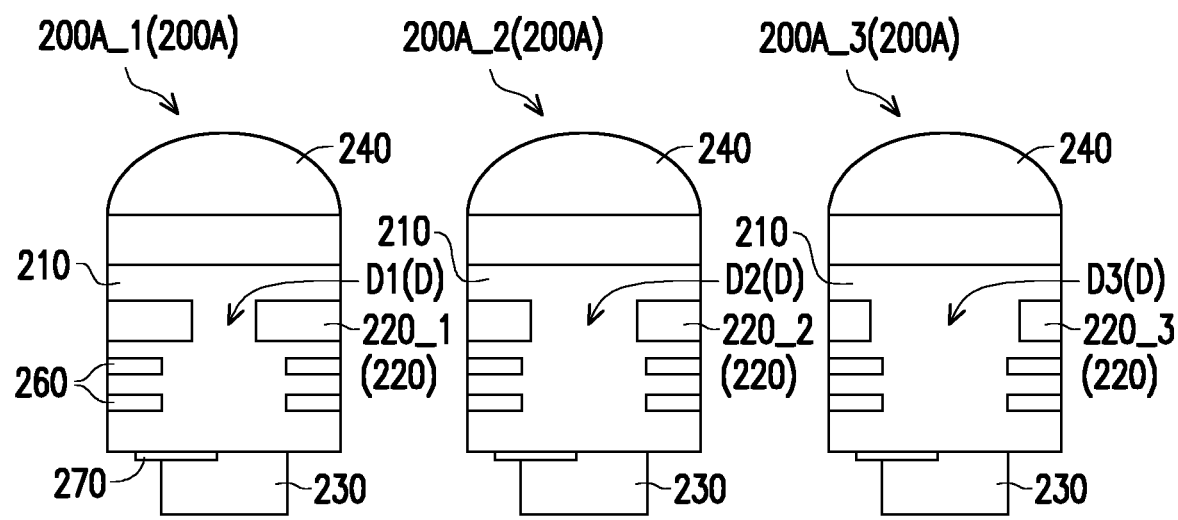
FIG. 5 is a schematic cross-sectional view of sensing pixels located at different positions in a sensing module according to another embodiment of the invention.

FIG. 5 is a schematic cross-sectional view of sensing pixels located at different positions in a sensing module according to another embodiment of the invention. Referring to both FIGS. 2 and 5, in this embodiment, sensing pixels 200A_1, 200A_2 and 200A_3 illustrated in FIG. 5 may respectively replace the sensing pixels 200_1, 200_2 and 200_3 illustrated in FIG. 3. The plurality of sensing pixels 200A_1, 200A_2 and 200A_3 of this embodiment are similar to the plurality of sensing pixels 200_1, 200_2 and 200_3 in FIG. 3. A difference therebetween is that in this embodiment, the structures (the cross-sectional areas of the sides, facing bodies 210, of microlenses 240) of the microlenses 240 of the plurality of sensing pixels 200A are identical, but the structures of metal layers 220 of the plurality of sensing pixels 200A_1, 200A_2 and 200A_3 are different. Specifically, in this embodiment, the area of an opening D of the metal layer 220 of a sensing pixel 200A increases as a distance from the center point C of a sensing unit 110 increases.

Figure 6:
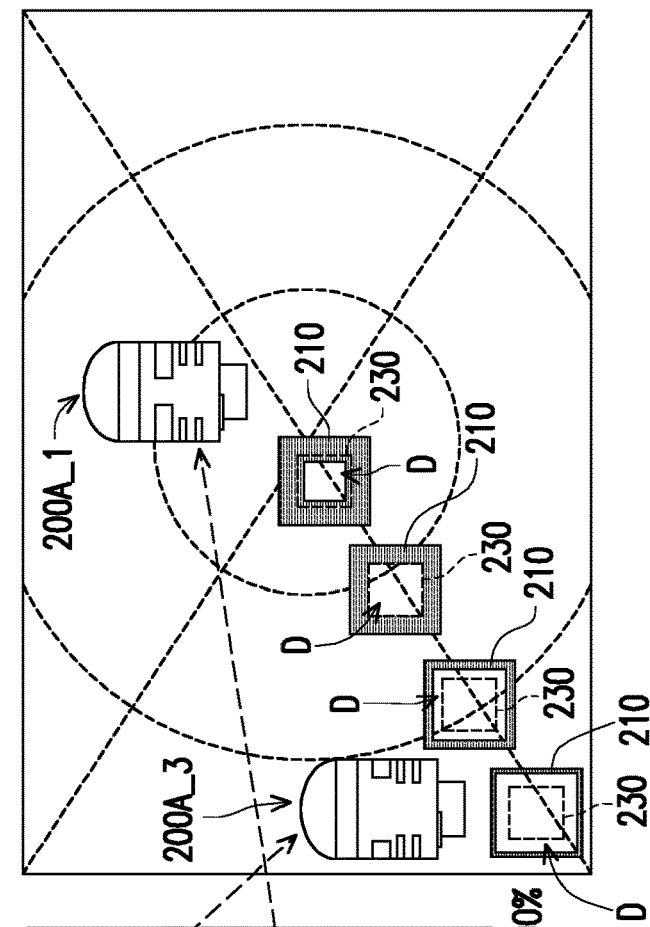
FIG. 6 shows a curve and diagram showing a correspondence between the photon collection efficiency of a sensing pixel and the size ratio of the area of an opening of a metal layer to the cross-sectional area of a body of the sensing pixel according to another embodiment of the invention.

FIG. 6 shows a curve and diagram showing a correspondence between the photon collection efficiency of a sensing pixel and the size ratio of the area of an opening of a metal layer to the cross-sectional area of a body of the sensing pixel according to another embodiment of the invention. Referring to FIGS. 2, 5 and 6, the structures of the plurality of sensing pixels 200A illustrated in FIG. 5 may be at least applied to the curve illustrated in FIG. 6. In this embodiment, a curve 401 refers to the photon collection efficiency corresponding to different size ratios of the areas of the openings D of the metal layers 220 to the cross-sectional areas of the bodies 210 of the plurality of sensing pixels 200A. The ordinate refers to the photon collection efficiency, and the abscissa refers to a ratio of the area of the opening D of the metal layer 220 to the cross-sectional area of the body 210 of the sensing pixel 200A. As shown in FIG. 6, when the ratio of the area of the opening D of the metal layer 220 to the cross-sectional area of the body 210 of the sensing pixel 200A is from 0.4 to 0.85, the photon collection efficiency may substantially linearly increase along with the growth of the ratio from 0.4 to 0.85. In other words, when the ratio of the area of the opening D of the metal layer 220 to the cross-sectional area of the sensing pixel 200A increases from 0.4 to 0.85, the photon collection efficiency may substantially linearly increase. Therefore, during the design of the plurality of sensing pixels 200A located at different positions, the photon collection efficiency of the plurality of sensing pixels 200A may be designed by adjusting the ratios of the areas of the openings D of the metal layers 220 to the cross-sectional areas of the plurality of sensing pixels 200A to be from 0.4 to 0.85. As a result, the light signal intensities sensed by the plurality of sensing pixels located at different positions in a sensing array may be uniformized.

Particularly, in this embodiment, the area of the opening D1 of the metal layer 220_1 of the sensing pixel 200A_1 closer to the center point C of the sensing unit 110 is smaller than the area of the opening D2 of the metal layer 220_2 of the sensing pixel 200A_2 at a medium distance from the center point C of the sensing unit 110, and the area of the opening D2 of the metal layer 220_2 of the sensing pixel 200A_2 at the medium distance from the center point C of the sensing unit 110 is smaller than the area of the opening D3 of the metal layer 220_3 of the sensing pixel 200A_3 farther from the center point C of the sensing unit 110. Therefore, the photon collection efficiency of a sensing pixel 200A increases as the distance from the center point C of the sensing unit 110 increases, and then the light signal intensities sensed by the plurality of sensing pixels 200A at different positions in the sensing unit 110 of the sensing module 100 may be uniformized.

In another embodiment, the area of the opening D of the metal layer 220 of the sensing pixels 200A in the first group (e.g. the group formed by the sensing pixels 200A inside the dotted circle at which the sensing pixel 200A_1 is located, as shown in FIG. 6) is less than the area of the opening D of the metal layer 220 of the sensing pixels 200 in the second group (e.g. the group formed by the sensing pixels 200A outside the dotted circle at which the sensing pixel 200A_1 is located, as shown in FIG. 6). As a result, the photon collection efficiency of the sensing pixels 200A in the second group is greater than the photon collection efficiency of the sensing pixels 200A in the first group, so that the light signal intensities sensed by the plurality of sensing pixels 200A at different positions in the sensing array of the sensing module 100 may be uniformized.

Figure 7:
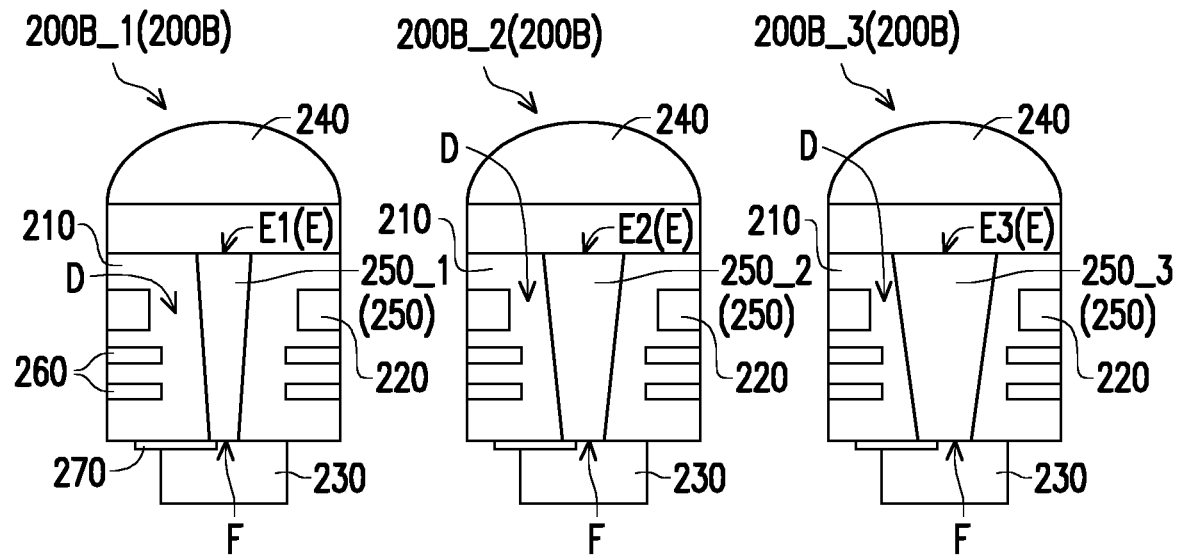
FIG. 7 is a schematic cross-sectional view of sensing pixels located at different positions in a sensing module according to another embodiment of the invention.

FIG. 7 is a schematic cross-sectional view of sensing pixels located at different positions in a sensing module according to another embodiment of the invention. Referring to FIGS. 2 and 7, in this embodiment, sensing pixels 200B_1, 200B_2 and 200B_3 illustrated in FIG. 7 may respectively replace the sensing pixels 200_1, 200_2 and 200_3 illustrated in FIG. 3. The plurality of sensing pixels 200B_1, 200B_2 and 200B_3 of this embodiment are similar to the plurality of sensing pixels 200_1, 200_2 and 200_3 illustrated in FIG. 3. A difference therebetween is that in this embodiment, the microlenses 240 of the plurality of sensing pixels 200B are identical and each of the plurality of sensing pixels 200B_1, 200B_2 and 200B_3 further includes a light guide structure 250. The light guide structure 250 is, for example, a light-pipe with relatively high refractive index, and is configured to increase the photon collection efficiency. In a sensing pixel 200B, when the cross-sectional area of an upper opening E of the light guide structure 250 disposed in the body 210 is smaller, the photon collection efficiency of the sensing pixel 200B is lower. When the cross-sectional area of the upper opening E of the light guide structure 250 disposed in the body 210 is larger, the photon collection efficiency of the sensing pixel 200B is higher. When a ratio of the cross-sectional area of the upper opening E of the light guide structure 250 of the sensing pixel 200B to the cross-sectional area of the body 210 of the sensing pixel 200B is from 0.3 to 0.7, the photon collection efficiency of the sensing pixel 200B may substantially linearly increase. In this embodiment, the light guide structure 250 of the sensing pixel 200B is of an inversely pyramidal structure, but also may be of other shapes or structures, and the invention is not limited thereto. In this embodiment, the size of the upper opening E (an opening close to the microlens) of the light guide structure 250 of the sensing pixel 200B may be greater than the size of a lower opening F (close to the sensing element) thereof. However, in some embodiments, the size of the upper opening E of the light guide structure 250 may be equal to the size of the lower opening F thereof, and the invention is not limited thereto. Specifically, in this embodiment, the area of the upper opening E of the light guide structure 250 of the sensing pixel 200B increases as the distance from the center point C of the sensing unit 110 increases.

In this embodiment, when the ratio of the cross-sectional area of the upper opening E of the light guide structure 250 to the cross-sectional area of the body 210 of the sensing pixel 200B is from 0.3 to 0.7, the photon collection efficiency may substantially linearly increase along with the growth of the ratio from 0.3 to 0.7. In other words, when the ratio of the cross-sectional area of the upper opening E of the light guide structure 250 to the cross-sectional area of the body 210 of the sensing pixel 200B increases from 0.3 to 0.7, the photon collection efficiency may substantially linearly increase. Therefore, during the design of the plurality of sensing pixels 200B located at different positions of a sensing array, the photon collection efficiency of the plurality of sensing pixels 200B may be designed by adjusting the ratio of the cross-sectional area of the upper opening E of the light guide structure 250 to the cross-sectional area of the body of the sensing pixel 200B to be from 0.3 to 0.7. As a result, the light signal intensities sensed by the plurality of sensing pixels 200B at different positions in the sensing unit 110 may be uniformized.

Figure 8:
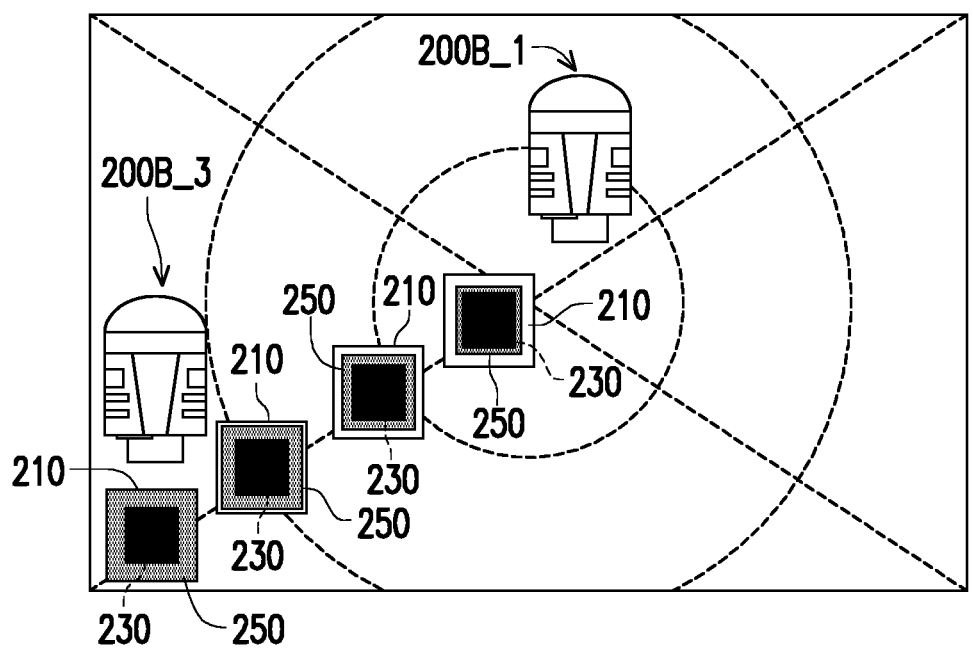
FIG. 8 is a schematic diagram of the plurality of sensing pixels of FIG. 7 corresponding to different positions in a sensing unit.

FIG. 8 is a schematic diagram of the plurality of sensing pixels of FIG. 7 corresponding to different positions in a sensing unit. Particularly, the cross-sectional area of the upper opening E1 of the light guide structure 250_1 of the sensing pixel 200B_1 closer to the center point C of the sensing unit 110 is smaller than the cross-sectional area of the upper opening E2 of the light guide structure 250_2 of the sensing pixel 200B_2 at a medium distance from the center point C of the sensing unit 110, and the cross-sectional area of the upper opening E2 of the light guide structure 250_2 of the sensing pixel 200B_2 at a medium distance from the center point C of the sensing unit 110 is smaller than the cross-sectional area of the upper opening E3 of the light guide structure 250_3 of the sensing pixel 200B_3 farther from the center point C of the sensing unit 110. Therefore, the photon collection efficiency of a sensing pixel 200B increases as the distance from the center point C of the sensing unit 110 increases, and the light signal intensities sensed by the plurality of sensing pixels 200B at different positions in a sensing array of the sensing module 100 may be uniformized.

In another embodiment, the cross-sectional area of the upper opening E of a light guide structure 250 of the sensing pixels 200B in the first group (e.g. the group formed by the sensing pixels 200B inside the dotted circle at which the sensing pixel 200B_1 is located, as shown in FIG. 8) is less than the cross-sectional area of the upper opening E of the light guide structure 250 of the sensing pixels 200B in the second group (e.g. the group formed by the sensing pixels 200B outside the dotted circle at which the sensing pixel 200B_1 is located, as shown in FIG. 8). As a result, the photon collection efficiency of the sensing pixels 200B in the second group is greater than the photon collection efficiency of the sensing pixels 200B in the first group, so that the light signal intensities sensed by the plurality of sensing pixels 200B at different positions in the sensing array of the sensing module 100 may be uniformized.

Figure 9:
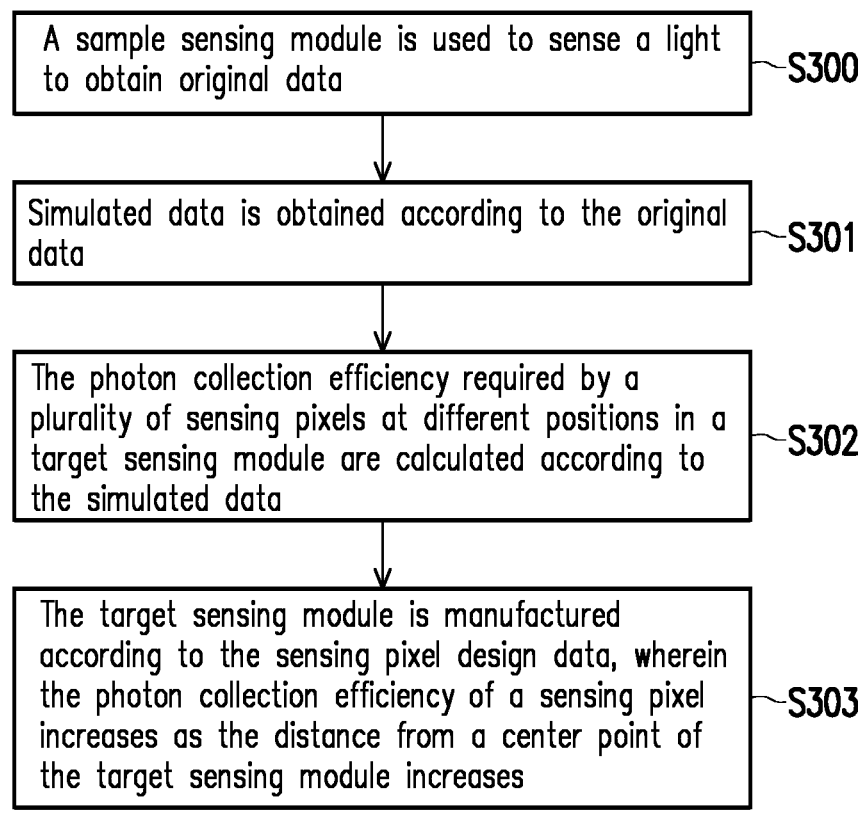
FIG. 9 is a flowchart of steps of a design method of a sensing module according to an embodiment of the invention.
Figure 10:
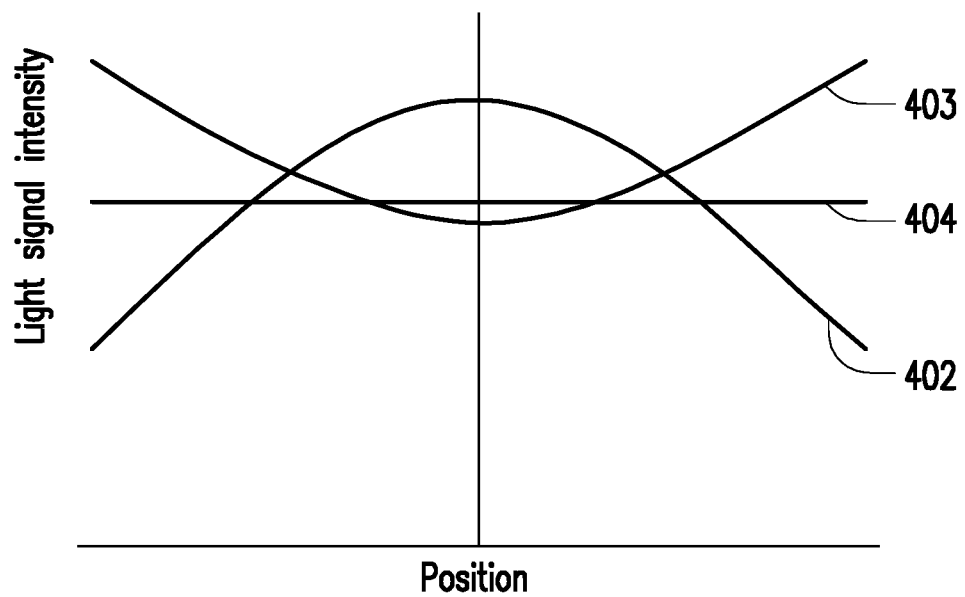
FIG. 10 shows distribution curves of values corresponding to different positions in a sensing array for different steps of the flow of FIG. 9.

FIG. 9 is a flowchart of steps of a design method of a sensing module according to an embodiment of the invention, and FIG. 10 shows distribution curves of values corresponding to different positions in a sensing array for different steps of the flow of FIG. 9. Referring to FIGS. 1, 2, 9 and 10, this embodiment provides a design method of a sensing module 100. The design method of a sensing module 100 may be at least applied to designing the sensing modules 100 illustrated in FIGS. 1 and 2. In this embodiment, firstly, in Step S300, a sample sensing module (not shown) is used to sense a light to obtain original data. A finger 10 or a non-finger object is placed on a display device 60, and the display device 60 emits a light to illuminate the finger or the object. The light is then reflected to reach the sample sensing module. Therefore, a light intensity data (i.e. the above original data) is sensed by the sample sensing module, and the distribution of light intensities is as shown as a curve 402 illustrated in FIG. 10. The sample sensing module is defined as a sensing module including sensing pixels having the same structures such as the same bodies, metal layers and microlenses. The light signal intensities sensed by the sample sensing module show that the light signal intensities sensed by the sensing pixels closer to the center of a sensing array are higher, and the light signal intensities sensed by the sensing pixels closer to the edge of the sensing array are lower.

In Step S301, simulated data is obtained according to the original data. Particularly, in this embodiment, the method for generating the simulated data according to the original data includes the step of calculating reciprocals of the values of the original data to form the simulated data. In other words, in this step, a distribution of light signal intensities (namely the values closer to the center are higher and the values closer to the edge are lower) sensed by the sample sensing module is inversed, and then simulated data with a distribution of values where the values closer to the center are lower and the values closer to the edge are higher is obtained, as shown in a curve 403 illustrated in FIG. 10.

Then, in Step S302, the photon collection efficiency required by a plurality of sensing pixels at different positions in a target sensing module are calculated according to the simulated data (namely the curve 403). That is, it is designed that the sensing pixels closer to the center of the sensing array have lower photon collection efficiency and the plurality of sensing pixels closer to the edge of the sensing array have higher photon collection efficiency, so that the photon collection efficiency of a sensing pixel may increase as the distance from the center of the sensing array increases. Then, structural data of the plurality of sensing pixels at different positions of the target sensing module are determined according to the photon collection efficiency, so as to form layout design data of a sensing array. In this embodiment, the structural data comprises the dimensions of the microlenses 240 (see FIG. 3), the sizes of the openings D of the metal layers 220 (see FIG. 5), or the sizes of the upper openings E of the light guide structures 250 (see FIG. 7). Particularly, in this embodiment, the structural data corresponding to the simulated data may be designed according to the obtained simulated data (namely the curve 403). Then, corresponding sensing pixel design data, such as structural specification data for the plurality of sensing pixels 200, are formed or generated according to the obtained structural data.

Then, in Step S303, the target sensing module is manufactured according to the sensing pixel design data. The photon collection efficiency of a sensing pixel increases as the distance from a center point of the target sensing module increases. Therefore, the light signal intensities sensed by the plurality of sensing pixels at different positions in the sensing array may be uniformized, so as to obtain uniform sensed light signal intensities, as shown by a curve 404 illustrated in FIG. 10.

In another embodiment, it may be designed that the photon collection efficiency of the sensing pixels 200 in the first group (e.g. the group formed by the sensing pixels 200 inside the dotted circle at which the sensing pixel 200_1 is located, as shown in FIG. 2) is less than the photon collection efficiency of the sensing pixels 200 in the second group (e.g. the group formed by the sensing pixels 200 outside the dotted circle at which the sensing pixel 200_1 is located, as shown in FIG. 2).

Based on the above, according to the sensing module and the design method thereof of the invention, the plurality of sensing pixels at different positions in the sensing unit of the sensing module are designed to have different structures, and the photon collection efficiency of the sensing pixels having a shorter distance from the center point of the sensing unit is lower than the photon collection efficiency of the sensing pixels having a longer distance from the center point of the sensing unit due to different structures. For example, the photon collection efficiency of a sensing pixel may increase as the distance from the center point of the sensing unit increases. As a result, the light signal intensities sensed by the plurality of sensing pixels at different positions in the sensing array may be uniformized.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A sensing module, comprising a sensing unit, wherein the sensing unit is formed by a plurality of sensing pixels arranged in an array, and each of the plurality of sensing pixels comprises:
   a body; and
   a sensing element, disposed on a bottom surface of the body,
   wherein during sensing, a light enters and passes through the body and is transmitted to the sensing element; the plurality of sensing pixels are divided into at least a first group and a second group from a center of the array to a periphery of the array, and photon collection efficiency of sensing pixels in the first group is less than photon collection efficiency of sensing pixels in the second group, and
   the sensing element of each of the plurality of sensing pixels are all the same.

2. The sensing module according to claim 1, wherein each of the plurality of sensing pixels further comprises a microlens, disposed on a top surface of the body, and an area of a side, facing the body, of a microlens of each of the sensing pixels in the first group is less than an area of a side, facing the body, of a microlens of each of the sensing pixels in the second group.

3. The sensing module according to claim 2, wherein a ratio of the area of the side, facing the body, of the microlens of each of the plurality of sensing pixels to a cross-sectional area of the body of each corresponding sensing pixel ranges from 0.4 to 1, and photon collection efficiency of the sensing pixel increases as the above ratio increases.

4. The sensing module according to claim 1, wherein each of the plurality of sensing pixels further comprises a metal layer disposed in the body; the metal layer has an opening; and an area of an opening of a metal layer of each of the sensing pixels in the first group is less than an area of an opening of a metal layer of each of the sensing pixels in the second group.

5. The sensing module according to claim 4, wherein a ratio of an area of the opening of the metal layer of each of the plurality of sensing pixels to a cross-sectional area of the body of each corresponding sensing pixel ranges from 0.4 to 0.85, and photon collection efficiency of the sensing pixel increases as the above ratio increases.

6. The sensing module according to claim 1, wherein each of the plurality of sensing pixels further comprises a light guide structure, and a cross-sectional area of an upper opening of a light guide structure of the sensing pixels in the first group is less than a cross-sectional area of an upper opening of a light guide structure of the sensing pixels in the second group.

7. The sensing module according to claim 6, wherein a ratio of a cross-sectional area of an upper opening of the light guide structure of each of the plurality of sensing pixels to a cross-sectional area of the body of each corresponding sensing pixel ranges from 0.3 to 0.7, and photon collection efficiency of each of the plurality of sensing pixels increases as the above ratio increases.

8. The sensing module according to claim 6, wherein the light guide structure of each of the plurality of sensing pixels is of an inversely pyramidal structure.

9. The sensing module according to claim 1, wherein the sensing element of each of the plurality of sensing pixels is a photodiode.

10. The sensing module according to claim 1, wherein the light is from a display device.

11. A design method of a sensing module, comprising:
sensing a light by a sample sensing module to obtain original data;
obtaining simulated data according to the original data;
calculating photon collection efficiency required by a plurality of sensing pixels at different positions in a target sensing module according to the simulated data, and determining structural data of the plurality of sensing pixels at different positions in the target sensing module according to the photon collection efficiency to form sensing pixel design data; and
manufacturing the target sensing module according to the sensing pixel design data, wherein the plurality of sensing pixels are divided into at least a first group and a second group from a center of the target sensing module to a periphery of the target sensing module, and photon collection efficiency of sensing pixels in the first group is less than photon collection efficiency of sensing pixels in the second group.

12. The design method of a sensing module according to claim 11, wherein the method of obtaining simulated data according to the original data comprises:
calculating a reciprocal of a value of the original data to form the simulated data.

13. The design method of a sensing module according to claim 11, wherein the sensing pixel design data comprise structural specification data of the plurality of sensing pixels.

14. The design method of a sensing module according to claim 13, wherein the structural specification data of each of the plurality of sensing pixels is a ratio of an area of the side, facing a body, of a microlens of each of the plurality of sensing pixels to a cross-sectional area of the body of each corresponding sensing pixel.

15. The design method of a sensing module according to claim 13, wherein the structural specification data of each of the plurality of sensing pixels is a ratio of an area of an opening of a metal layer of each of the plurality of sensing pixels to a cross-sectional area of a body of each corresponding sensing pixel.

16. The design method of a sensing module according to claim 13, wherein the structural specification data of each of the plurality of sensing pixels is a ratio of a cross-sectional area of an upper opening of a light guide structure of each of the plurality of sensing pixels to a cross-sectional area of a body of each corresponding sensing pixel.

* * * * *